Oct. 19, 1965
H. K. GRAVES
3,212,839
OPTICAL RECTIFIER
Filed Oct. 29, 1962
4 Sheets-Sheet 3
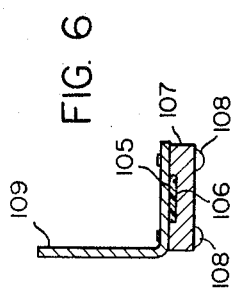
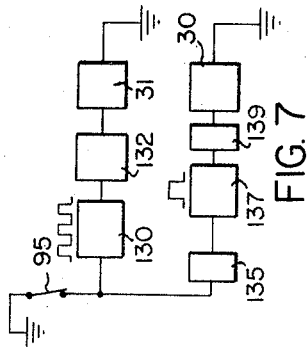
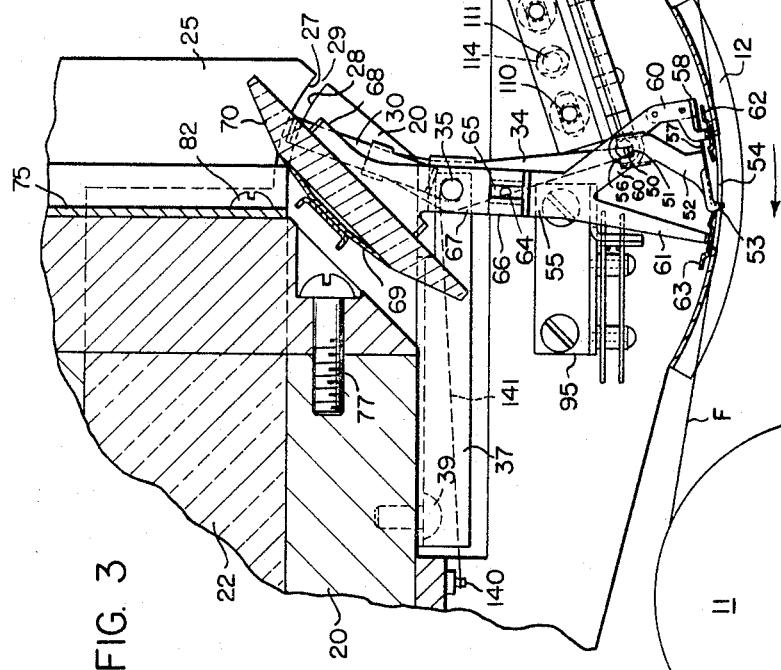
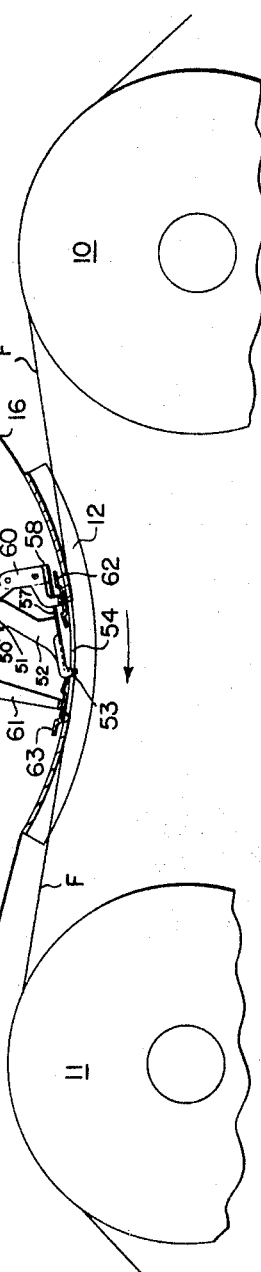
INVENTOR.
HOWARD K. GRAVES
BY
ATTORNEY Oct. 19, 1965   H. K. GRAVES   3,212,839
OPTICAL RECTIFIER
Filed Oct. 29, 1962   4 Sheets-Sheet 4

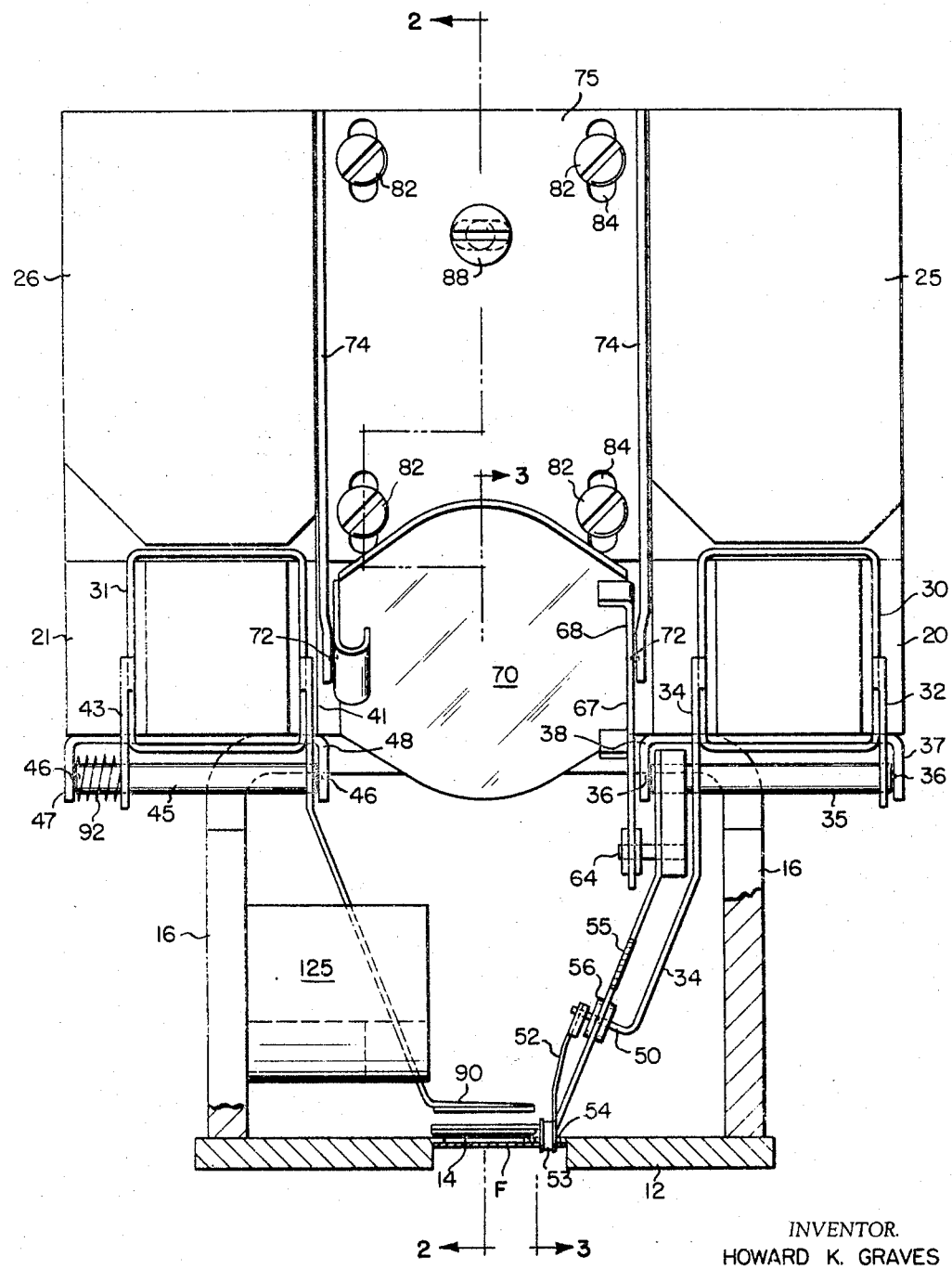

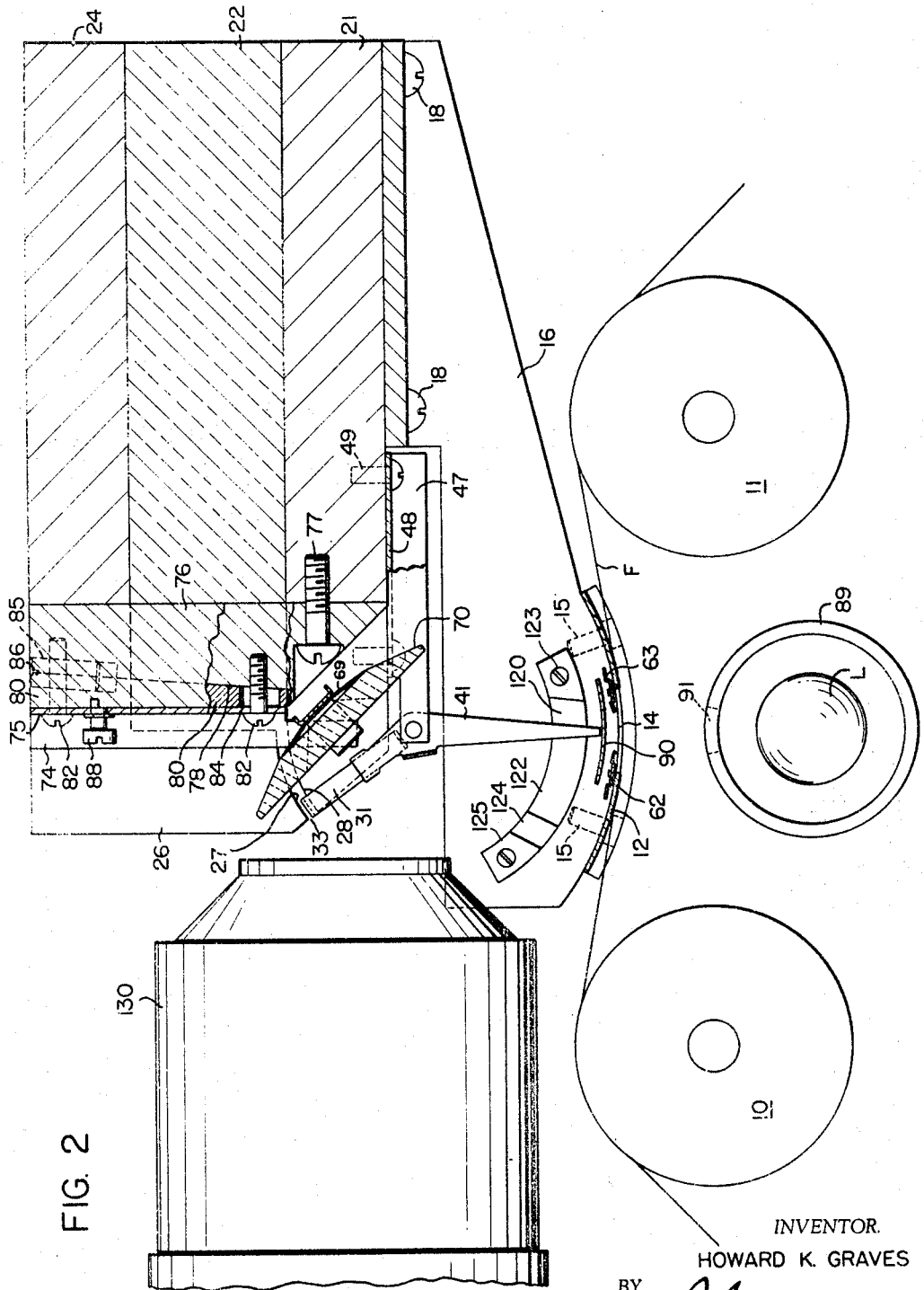

INVENTOR.
HOWARD K. GRAVES
BY
ATTORNEY

United States Patent Office 3,212,839
Patented Oct. 19, 1965

3,212,839
OPTICAL RECTIFIER
Howard K. Graves, Fairport, N.Y., assignor to Graflex, Inc., Rochester, N.Y., a corporation of Delaware
Filed Oct. 29, 1962, Ser. No. 233,789
15 Claims. (Cl. 352—109)

The present invention relates to optical rectifiers, and more particularly to mechanism for optically scanning moving parts and causing them to appear stationary. In a more specific aspect, the invention relates to mechanism which will permit photographic film to be driven continuously at a uniform rate of speed through a motion picture projector while making the individual frame of the film appear stationary as each is successively projected on a screen.

In the conventional motion picture projector an intermittent motion is imparted to the film so that each frame is stationary when in registry with the aperture of the projector. One disadvantage of such projectors is that, though the intermittent drive mechanism for the film has been greatly improved over the years, there is still always some residual unsteadiness of the picture. The conventional motion picture projector, moreover, is noisy in operation because the intermittent drive causes film slap. Another disadvantage of conventional projectors is the effect of the intermittent drive mechanism on the film itself. In the conventional projector, the drive mechanism has to pull the film intermittently by engagement with the perforations in the film. This tends to wear the film at the projections and to enlarge them so that the perforations of a film, which has been projected a number of times, become so worn that the film may be no longer suitable for projection. Another problem with the conventional motion picture projector is that of synchronizing the sound with the projection; in the conventional projector the film has to be threaded over idlers and in several loops to damp out as much as possible the jerkiness of the intermittent drive. Because of the intermittent pull-down drive, also, film cannot be run too fast in the conventional projector. Furthermore, in the conventional projector in order to rewind film at faster speed, the film must be unthreaded from the intermittent mechanism.

Projectors are known in which the film travels continuously past the projecting lens system. In one previous such projector a rotary crown of mirrors, as, for instance, an octagonal mirror, has been used; and the film has been driven through a sprocket. Because the pivot for the mirrors is at the center of rotation a correction must be made by a cam on the axis of rotation operating through levers. There is no flicker with this system but the drive is complicated and unsteady. Moreover, film shrinkage, which is always present to more or less degree, affects the image projected; and a mechanism must be provided to compensate therefor. In some cases the shrinkage of the film is measured and a zoom lens is adjusted to compensate for such shrinkage.

One object of the present invention is to provide an optical system for motion picture film projectors through which the steadiness of the picture projection will be superior to that of conventional projectors.

Another object of the invention is to provide an improved motion picture projector in which the film to be projected may be driven constantly at uniform speed.

Another object of the present invention is to provide a motion picture film projector which will be relatively quiet as compared with conventional projectors because of the continuous drive of the film and the elimination thereby of film slap.

Another object of the invention is to provide a motion picture projector through which it is much simpler to thread the film because it is no longer necessary to provide loops for the film.

A further object of the invention is to provide a motion picture projector which can handle even badly damaged film.

Another object of the invention is to provide a motion picture projector which will be much easier on film than conventional projectors.

A further object of the invention is to provide a motion picture projector which will minimize the problems of synchronization of sound with projection of film, and improve the steadiness of the sound.

Still another object of the invention is to provide a motion picture projector in which the film can be either wound or rewound at high speed.

A still further object of the invention is to provide optical rectifying apparatus suitable for use in a motion picture camera, a motion picture film editor, or the like, where it is desired to scan a continuously moving film or sheet and be able to see the images or other material on the moving sheet or film as though the sheet or film was intermittently stationary.

Other objects of the invention will be apparent hereinafter from the specification and from the recital of the appended claims.

In the drawings:

FIG. 1 is a fragmentary front view of a motion picture projector incorporating an optical rectifier system made according to one embodiment of this invention;

FIG. 2 is a section through this mechanism, taken on the line 2—2 of FIG. 1, looking in the direction of the arrows, and showing further parts of the film drive, the projection lamp and its housing, and the projector lens mount;

FIG. 3 is a sectional view in a plane parallel to the plane in FIG. 2, taken generally on the line 3—3 of FIG. 1 looking in the direction of the arrows;

FIG. 6 is a detail sectional view illustrating the dashpotting stop for the mirror coil arm; and FIG. 7 is an electrical diagram showing how the apparatus may be wired to accomplish its purpose.

Figure 4:
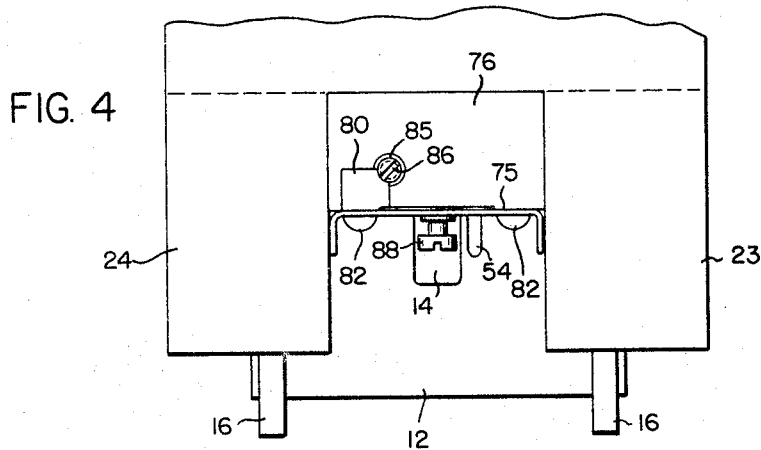
FIG. 4 is a fragmentary top plan view of the projector.

In the optical rectifier system illustrated a mirror is employed to reflect the image from the film into the projector lens; and this mirror is pivoted in synchronism with the continuously moving film during the travel of each frame of the film past the film gate or aperture, so that the continuously moving frame will appear stationary on the screen onto which it is projected. The mirror moves in time with the film for the extent of a frame; then snaps back. It is connected intermittently with the film through perforations in the film by a two to one linkage so that it moves at half the rate of speed of travel of the film per frame. The mirror is connected with the film by a claw that engages in the perforations of the film to impart a rocking motion to the mirror as each frame travels across the aperture or film gate.

After a frame has been projected, the claw is fully raised out of the perforation and then snapped back by electrical energy. When the claw drops back into engagement with the film, it engages a new perforation in the film to travel forward again with the film. The claw is pivoted on a main drive arm. The main arm hits an electrical switch at the end of the forward stroke of the claw. This energizes an electro-magnetic coil to raise and return the claw.

When the switch is closed the shutter of the projector is also swung in. The shutter is spring-loaded to snap back to its initial position when the next frame of the film is in position to be projected. There is a time delay in the operation of the mirror electromagnet so that the shutter is in operative position before the mirror snaps back to its starting position. When the mirror snaps back it is dashpotted by a thin strip of nylon sliding in oil whose viscosity causes the dashpotting. A spring pushes the nylon strip forward again at the end of the dashpotting operation.

The film is held against a curved guide by the driving tension on it; and no pressure plate is required to hold the film against the film gate or aperture. Two masks cover the frames preceding and following, respectively, the frame which is being projected. The masks are fastened to the main arm to move with the claw.

Referring now to the drawings by numerals of reference F (FIG. 2) denotes the film which is to be projected. The film travels between idlers or spools 10 and 11 over an aperture plate 12 having an aperture 14 therein. The aperture plate 12 is convexly curved on the side, on which the film rides, as shown in FIG. 2; and the tension on the film as it travels over the rollers 10 and 11 holds it against the aperture plate. The aperture plate is secured by screws 15 on the bottom faces of the legs of an inverted U-shaped piece 16 that in turn is fastened by screws 18 to the lower, iron pole pieces 20 and 21 of a ceramic magnet 22. The magnet is a rectangular ceramic block. Mounted on top of the magnet block are other soft iron pole pieces 23 and 24 which have depending portions 25 and 26 whose lower faces are concavely curved, as denoted at 27 (FIG. 2), to confront convexly curved surfaces 28 of the pole pieces. There is a gap 29 between the concave surface 27 of the toe portion 25 of pole piece 23 and the convex surface 28 of pole piece 20; and similarly there is a gap 33 between the concave surface 27 of the toe portion 26 of the pole piece 24 and the associated convex surface 28 of pole piece 21.

In these gaps are disposed the movable wire wound electrical coils 30 and 31, respectively (FIG. 1). Coil 30 is carried by arms 32 and 34 which are pivoted on a rod or shaft 35 that is pivoted by means of balls 36 in the downturned portions 37 of an inverted, generally U-shaped plate 38 that is secured by screws 39 (FIG. 3) to the pole piece 20.

The coil 31 is carried by arms 41 and 43 which are secured to a rod or shaft 45 that is pivoted by means of balls 46 in the downturned portions 47 of a generally U-shaped plate 48, which is similar in construction to the plate 38, and which is secured to the pole piece 21 by screws 49 (FIG. 2).

Figure 5:
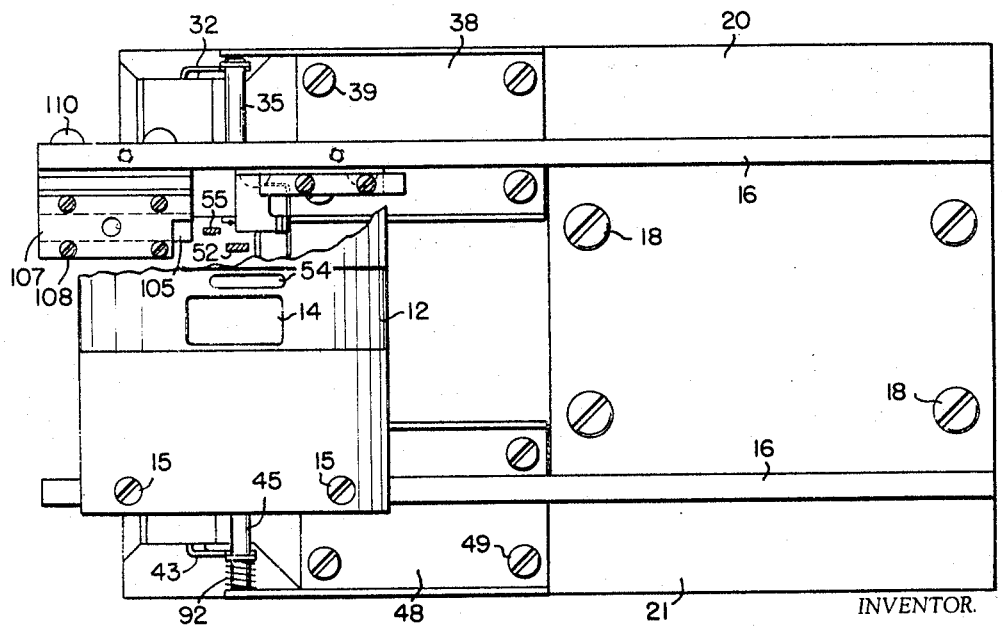
FIG. 5 is a fragmentary bottom view showing the mirror stops.

The arm 34 is elongate, and at its free end is bent at right angles as denoted at 50 (FIG. 1) to engage in the groove 51 (FIG. 3) of the forked portion at the upper end of a claw member 52. This claw member has a claw portion 53 that is adapted to extend through an elongate slot 54 (FIG. 5) in the aperture plate 12 and to engage in perforations of the film, so that the arm 34 is rocked by the film as the film moves forward, that is, from right to left in FIG. 3 (left to right in FIG. 2). Secured to the rod or shaft 35 rigidly therewith is a forked lever 55, which has a bushing 56 (FIG. 1) in one (60) of its forks (FIG. 3) through which the bent portion 50 of the arm 34 passes, so that forward motion of the arm 34 and of claw 53 is also transmitted to the lever 55. The bore of bushing 56 is somewhat larger in diameter than the bent portion 50 of arm 34 for a reason which will appear hereinafter. The claw member 52 has a leaf spring portion 57 (FIG. 3) integral with it which has a tab 58 formed integral with it at one end that is riveted to the lower portion of the fork 60. The other fork of this lever 55 is denoted at 61.

The arm 60 is bent adjacent its lower end to clear leaf spring portion 57 of claw member 52, and has secured to its lower end a mask 62 (FIG. 3). A similar mask 63 is secured to the lower end of fork 61 of lever 55. The masks 62 and 63 are spaced apart to cover the two frames of the film which are ahead of and behind, respectively, the frame being projected. The masks 62 and 63 are glued or welded to the forks of the claw arm.

In continuous projection the aperture covers two frames, which would result in a main image on the screen with a ghost image above and below it. To eliminate the ghost images with the reciprocating mirror projector of the present invention, the moving masks are used. This allows only one image to be projected on the screen at a time.

The arm 60 has a pin 64 projecting from it laterally adjacent its upper end. This pin engages in a slot 65 in a nylon block 66, that is carried by the depending arm 67 of a mirror holder 68 which carries the mirror 70, thereby to transmit to the mirror the forward motion of the claw 53 and the return motion of coil arm 34. The mirror is held resiliently in its holder by a leaf spring 69 which is interposed between the back of the mirror and the back of the holder.

The mirror holder is pivoted by balls 72 (FIG. 1) between side flanges 74 projecting forwardly from opposite sides of a plate 75. The plate 75 is mounted upon a block 76 that is secured by screws 77 (FIG. 2) in the recess between the depending portions 25 and 26 of the pole pieces 23 and 24 of the ceramic magnet 22.

The block 76 has an inclined front face 78 for a part of its width (FIGS. 2 and 4); and slidable upon this inclined front face of the block is a taper wedge 80, which is secured in place by the screws 82 that pass through elongate slots 84 (FIGS. 1 and 2) in the plate 75. Threaded into confronting portions of the block 76 and wedge 80 is an adjusting screw 85, which has a kerf at 86 to receive a screw driver by means of which it may be rotatably adjusted. The screw seats at its inner end against a shoulder on the block 76. This screw enables the wedge 80 to be adjusted on the block 76 to tilt the mirror holder 68 about the pivots 72 to adjust the position of the mirror to secure maximum horizontal steadiness.

The plate 75 is adjustable additionally on the wedge 80 by rotating a pin 88, which passes through the plate 75 and is journaled at its inner end in the block 76. This pin is eccentric of its journal portion so that as it is rotated the plate 75 is adjusted up or down on the wedge, thereby displacing the mirror holder bearings 72 relative to bearings 36 for arm 55. The adjustment by means of eccentric pin 88 permits the mirror to be adjusted precisely to secure the ratio between the film travel and the forward swing of the mirror that is necessary to accomplish vertical steadiness.

The adjustment of the plate 75 is to determine precisely the distance between the pivots 72 for the mirror and the pivots 36 for the driving arm 55. This distance must be held precisely within .0001 inch. The adjustment takes care of all tolerances in the system and should be such that the mirror pivots through an angle $\varphi/2$ as the film moves through an angle $\varphi$. In other words that the ratio of the mirror movement to the film movement is 1 to 2. An angular displacement of lever 67 by claw 52 causes lever 67 to move at the desired angular ratio.

The projection lamp is denoted at L. It is mounted in a housing 89 having an opening 91 in one wall through which light illuminates the frame of film, which is in registry with the film aperture 14. The mirror is adapted to reflect the frame of the film, which is in alignment with the aperture 14, through a projection lens mount 130 (FIG. 2), through which the image is projected onto a screen.

The arm 41 carries at its lower end the shutter 90. A coil spring 92 (FIG. 1), which is secured at one end to the arm 43 and at its other end to the strap 47, serves constantly to urge the shutter arm 41 to inoperative position.

As previously stated, the claw 53 engages in a perforation of the film F; and as the film is moved continuously forwardly, the claw is pulled by the film toward the right in FIG. 2. Mounted on one of the legs of the piece 16 is a combined stop and limit switch 95 (FIG. 3). When the arm 61 strikes the limit switch coil 31 is energized. This causes the coil 31 to swing to the right (FIG. 2) in the magnetic field between the pole piece 21 and the depending toe portion 26 of the pole piece 24, thereby swinging the shutter 90 over the aperture 14 in the aperture plate 12. The closing of the limit switch 95 also closes, after an extremely slight time delay, an electric circuit to the coil 30, energizing that coil, and causing it to be swung to the right in FIG. 3 in the gap 29 in the magnetic field between the pole piece 20 and the toe or calk portion 25 of the pole piece 23.

Energization of coil 30 causes the arm 34 to be swung backward; but the hole in the bushing 56 is larger in diameter than the portion 50 of arm 34 so that the arm 34 travels backwardly while arm 55 is still moving forwardly under its own inertia. The result is that the relative movement of the arms 34 and 55 causes the claw to be lifted out of the perforations with which it has been engaged. As soon as the play is taken up the arm 55, the claw and the mirror travel backward together. The relative movement of the main arm and claw, therefore, raises the claw. Then the claw is returned by the return movement of the main arm. The mirror is thus swung back to initial position.

The coil arm 34 has its backward swinging movement cushioned by a dashpot comprising a nylon strip 105 which is mounted to slide in a groove 106 (FIG. 6) formed in a plate 107 that is secured by screws 108 to a bracket 109 that is fastened by screws 110 to a side of the piece 16. The screws 110 pass through elongate slots 112 in the bracket 109; and an eccentric 111 passes through a separate elongate slot 114 in this bracket, which extends at right angles to the slots 112. Thereby the bracket 109 can be adjusted toward and away from the limit switch 95. The groove in the block 106, in which the nylon strip 105 slides, has a thin film of oil in it; and it is the viscosity of this oil that resists movement of the nylon strip, thereby dashpotting the movement of the coil arm and of the mirror system.

After the coil arm has engaged the nylon stop 105 (FIG. 6), the momentum of the claw arm causes the claw arm to drop down into position to engage a perforation in the film, to be carried forward again by the traveling film in a new cycle. Because the film brings the hole into registry with the claw, film shrinkage is no problem. So far is known this is the only system of continuous projection which is independent of film shrinkage. The film is guided so that it is curved on a radius with the pivotal axis 72 of the mirror as the center. This eliminates various optical problems.

The shutter arm 41 is constantly urged by the coil spring 92 against a foam rubber, or the like, cushion stop 120 (FIG. 2) which is secured to an arcuate plate 122 that is fastened by screws 123 to one leg of the U-shaped piece 16. When the shutter is swung into operative position by energization of the coil 31, the arm 41 is swung over against another cushion stop 124 cemented against a lug 125 on the plate 122.

In order to insure that the shutter is in position before the mirror snaps back, a time delay is employed. The electrical system is illustrated diagrammatically in FIG. 7.

One way in which the apparatus may be wired electrically to accomplish this purpose is illustrated diagrammatically in FIG. 7. When the switch 95 is closed a circuit is made through a conventional free-running pulse generator 130, a conventional current amplifier 132, and the shutter coil 31 to ground. Simultaneously a circuit is made through a time delay 135, a conventional single pulse generator 137, a conventional current amplifier 139, and the mirror coil 30 to ground. The time delay insures that the shutter will be in operative position before the mirror swings back. Thus, the film will be covered before the mirror is swung back.

To when the switch 95 is closed the shutter is swung in by pulse-operated coil 31. The shutter is spring loaded and snaps back to inoperative position. The electrical circuit driving the shutter preferably is an oscillator that puts out a pulse 48 times a second which operates the shutter for a film speed of 16 or 24 frames per second. If the shutter is running slow or fast the contact 95 synchronizes the electrical drive to the shutter. Film shrinkage will cause the spacing of the perforations in the film to vary slightly. To synchronize the shutter and mirror reset, both the mirror and the shutter coils are actuated by closing of the switch 95. The shutter may be carried on two or three shutter pulses but will again the reset by closing of the switch 95. Thus the approximately synchronized shutter and mirror pulses are locked in together once each cycle. If the synchronization is close, no flicker will result from the slightly uneven pulses of the shutter.

Applicant's projector is the only projector known which is independent of film shrinkage. With applicant's projector film that would stop another projector can readily be handled.

While the invention has been described in connection with a motion picture projector, it will be understood that it is applicable in any case where an optical rectifier is useful. It may be employed in cameras, editors, and any system of taking optical motion and making it stationary.

While the invention has been described in connection with a specific embodiment thereof, it will be understood that it is capable of further modification, and this application is intended to cover any variations, uses, or adaptations of the invention following, in general, the principles of the invention and including such departures from the present disclosures as come within known or customary practice in the art to which the invention pertains and as may be applied to the essential features hereinbefore set forth, and as fall within the scope of the invention or the limits of the appended claims.

Having thus described my invention, what I claim is:
1. A motion picture projector comprising
 (a) means for moving film continuously at uniform speed past a framing aperture,
 (b) a mirror,
 (c) a source of light disposed to project an image of each frame of the film on said mirror as the frame travels past the framing aperture,
 (d) means for oscillatably mounting said mirror,
 (e) a claw for engaging a perforation in the film,
 (f) lost-motion means detachably connecting said mounting means to said claw to swing the mirror in one direction during travel of a frame of the film past the framing aperture,
 (g) electrically-operated means for swinging said mounting means in the opposite direction back to its starting position,
 (h) said lost-motion means operating to disconnect said claw from the film after said mounting means begins its return to its starting position,
 (i) a reciprocable shutter for covering said framing aperture,
 (j) electrically-operated means for moving said shutter into operative position during swinging of said mounting means back to starting position and for moving said shutter to inoperative position again upon completion of said backward swing,
 (k) means for reconnecting said claw to the film to start a new cycle of oscillation upon completion of said backward swing,
 (l) electrical time delay means for delaying swing of said mounting means back to starting position until said shutter is in operative position,
 (m) both said electrically-operated means being electromagnetic means, and
 (n) said time delay being incorporated in the circuit to the electromagnetic means which effects swing of said mounting means back to its starting position.

2. A motion picture projector, comprising
(a) means for moving film continuously at uniform speed past a framing aperture,
(b) a mirror,
(c) a source of light disposed to project an image of each frame of the film on said mirror as the frame travels past the framing aperture,
(d) means for oscillatably mounting said mirror,
(e) means detachably connecting said mounting means to the film to swing the mirror in one direction during travel of a frame of the film past the framing aperture,
(f) means for disconnecting said mounting means from the film at the end of travel of each frame of the film past the framing aperture,
(g) a reciprocable shutter movable in one direction to cover said framing aperture and movable in the opposite direction to uncover said aperture,
(h) permanent magnetic means,
(i) two pairs of pole pieces associated with said magnetic means, the two pole pieces of each pair being mounted in opposed, spaced relation,
(j) a coil disposed in the space between each pair of pole pieces,
(k) one of said coils being connected to said mounting means and the other of said coils being secured to said shutter,
(l) a switch disposed to be tripped by said mounting means at the end of its travel in said one direction to close electric circuits to said coils to swing said mounting means back to starting position and to move said shutter to operative position,
(m) means for moving said shutter to inoperative position again upon completion of said backward swing, and
(n) means for reconnecting said mounting means to the film to start a new cycle of oscillation upon completion of said backward swing.

3. A motion picture projector as claimed in claim 2, wherein means is provided for delaying swing of said mounting means back to starting position until said shutter is in operative position.

4. A motion picture projector as claimed in claim 3, wherein said delaying means comprises an electrical time delay in the circuit to the coil which is secured to said mounting means.

5. A motion picture projector comprising
(a) means for moving film continuously at uniform speed past a framing aperture,
(b) a mirror,
(c) a source of light disposed to project an image of each frame of the film on said mirror as the frame travels past the framing aperture,
(d) a first pivoted lever means to one end of which said mirror is mounted,
(e) a pivoted claw connected to the opposite end of said first lever means and disposed to engage a perforation in the film to swing said first lever means in one direction during travel of a frame of the film past the framing aperture,
(f) a second pivoted lever means at one end of which a shutter is secured,
(g) means for disengaging said claw from the film at the end of swing of said first lever means in said one direction,
(h) means for returning said first lever means to its starting position after said claw has been disengaged,
(i) means for swinging said second lever means in one direction to move said shutter to operative position at the end of swing of said first lever means in said one direction,
(j) means for moving said second lever means in the opposite direction to move said shutter to inoperative position upon completion of return of said first lever means to its starting position, and
(k) means for re-engaging said claw with another perforation in the film to start a new cycle of oscillation upon completion of said return.

6. A motion picture projector as claimed in claim 5 wherein
(a) said means for swinging said second lever means to starting position is electrically-operated,
(b) said means for moving said shutter to operative position is electrically-operated,
(c) switch means is positioned to be actuated by said first lever means at the end of its movement in one direction to establish electric circuits to both said electrically-operated means, and
(d) an electrical time delay is incorporated in the circuit to the means for swinging said second lever means to starting position, whereby the return of said second lever means is delayed until said shutter has covered said framing aperture.

7. A motion picture projector as claimed in claim 5, wherein
(a) lost-motion means connects said claw to said first lever means,
(b) there is a third lever means connected to said first lever means to move therewith, and
(c) there are two spaced masks carried by said third lever means and disposed at opposite sides of said claw in the direction of travel of said claw to mask, respectively, the frames of film ahead of and behind the frame at said framing aperture.

8. A motion picture projector as claimed in claim 5 wherein
(a) said first lever means comprises two levers, one of which has said mirror secured to it at one end, and the other of which has said claw pivotally connected to it at one end, and whose other ends are pivotally connected to one another, and wherein
(b) said other lever is bifurcated and has masks secured to both its furcations in position to mask the frames of film preceding and following, respectively, the frame being reflected during travel of each frame past the framing aperture.

9. A motion picture projector as claimed in claim 8, wherein
(a) said means for returning said first lever means to starting position is electrically-operated,
(b) said means for swinging said second lever means to move said shutter to operative position is electrically-operated,
(c) a switch is positioned to be tripped by said first lever means at the end of its swing in said one direction to establish electric circuits to both said electrically-operated means,
(d) an electrical time delay is incorporated in the circuit to the means for returning said first lever means to starting position, whereby the return of said first lever means is delayed until said shutter has covered said framing aperture, and
(e) a spring is connected to said second lever means constantly to urge said shutter to inoperative position.

10. A motion picture projector comprising
(a) means for moving film continuously at uniform speed past framing aperture,
(b) a mirror,
(c) a source of light disposed to project an image of each frame of the film on said mirror as the frame travels past the framing aperture,
(d) a permanent magnet,
(e) two pairs of pole pieces disposed in operative relation to said magnet, the two pole pieces of a pair being spaced slightly from one another,
(f) an electrical coil pivoted to swing in the gap between each pair of pole pieces,
(g) a first pivoted lever on one end of which said mirror is mounted, (h) a second pivoted lever on one end of which one of said coils is carried, (i) a claw pivotally connected to said second lever at the opposite end of said second lever and disposed to engage a perforation in the film to swing said second lever in one direction during travel of the film past the framing aperture, (j) means connecting said first and second levers to one another to drive said first lever from said claw during travel of a frame of the film past the framing aperture, (k) a third pivoted lever on one end of which the other coil is carried, (l) a shutter mounted on the other end of said third lever, (m) a switch positioned to be actuated at the end of swing of said first lever in one direction to close electric circuits to both said coils, (n) an electric time delay in the circuit to said one coil to delay energization of said one coil and the return swing of said first lever until said other coil has swung said third lever in a direction to move said shutter to operative position over said framing aperture, (o) means for returning said shutter to inoperative position, and (p) means for moving said claw to re-engage the film upon completion of said return swing, thereby to initiate start of a new cycle of oscillation.

11. A motion picture projector as claimed in claim 10, wherein (a) said means connecting said first and second levers comprises a fourth bifurcated lever, and (b) a mask is secured to each furcation of said fourth lever to mask the frames of film preceding and following, respectively, the frame being reflected, during travel of each frame past the framing aperture.

12. A motion picture projector as claimed in claim 11, wherein the means for returning said shutter to inoperative position comprises a spring connected at one end to said third lever, and at its opposite end to a part fixed relative to said magnet.

13. A motion picture projector as claimed in claim 10, wherein (a) the framing aperture is in an arcuate guide over which the film travels, and (b) said guide is coaxial with the pivot of said first lever.

14. A motion picture projector as claimed in claim 10, wherein the pivot of said first lever is so disposed that the mirror swings at a rate half the speed of travel of the film.

15. Motion picture apparatus comprising (a) means for moving film continuously at uniform speed past a framing aperture, (b) a mirror, (c) a source of light disposed to project an image of each frame of the film onto said mirror as the frame travels past the framing aperture, (d) means for oscillatably mounting said mirror, (e) means detachably connecting said mounting means to the film to swing said mirror in one direction during travel of the film past the framing aperture, (f) means for disconnecting said mounting means from the film at the end of the travel of each frame of the film past the framing aperture, (g) means for thereupon swinging said mounting means in the opposite direction back to its starting position, (h) a reciprocable shutter for covering said framing aperture, (i) means for reciprocating said shutter to move it into operative position prior to swing of said mounting means back to starting position and to move it to inoperative position again upon completion of said backward swing, (j) means for reconnecting said mounting means to the film to start a new cycle of oscillation upon completion of said backward swing, (k) means for synchronizing said shutter with the swing of said mounting means once per cycle, (l) said shutter reciprocating means including a free-running electrical multivibrator, (m) electrically-operated means for actuating said mirror oscillating means, and (n) said synchronizing means including a switch in the circuit to said multivibrator and also in the circuit to said electrically-operated mirror oscillating means.

References Cited by the Examiner

FOREIGN PATENTS 138,629   8/34   Australia.

NORTON ANSHER, *Primary Examiner.*

JOHN M. HORAN, *Examiner.*